March 21, 1967 L. R. YESKE 3,309,853
AGRICULTURAL IMPLEMENT
Original Filed April 19, 1962 3 Sheets-Sheet 1

INVENTOR.
LAUREL R. YESKE.
BY
Emerson B Donnell
ATTY

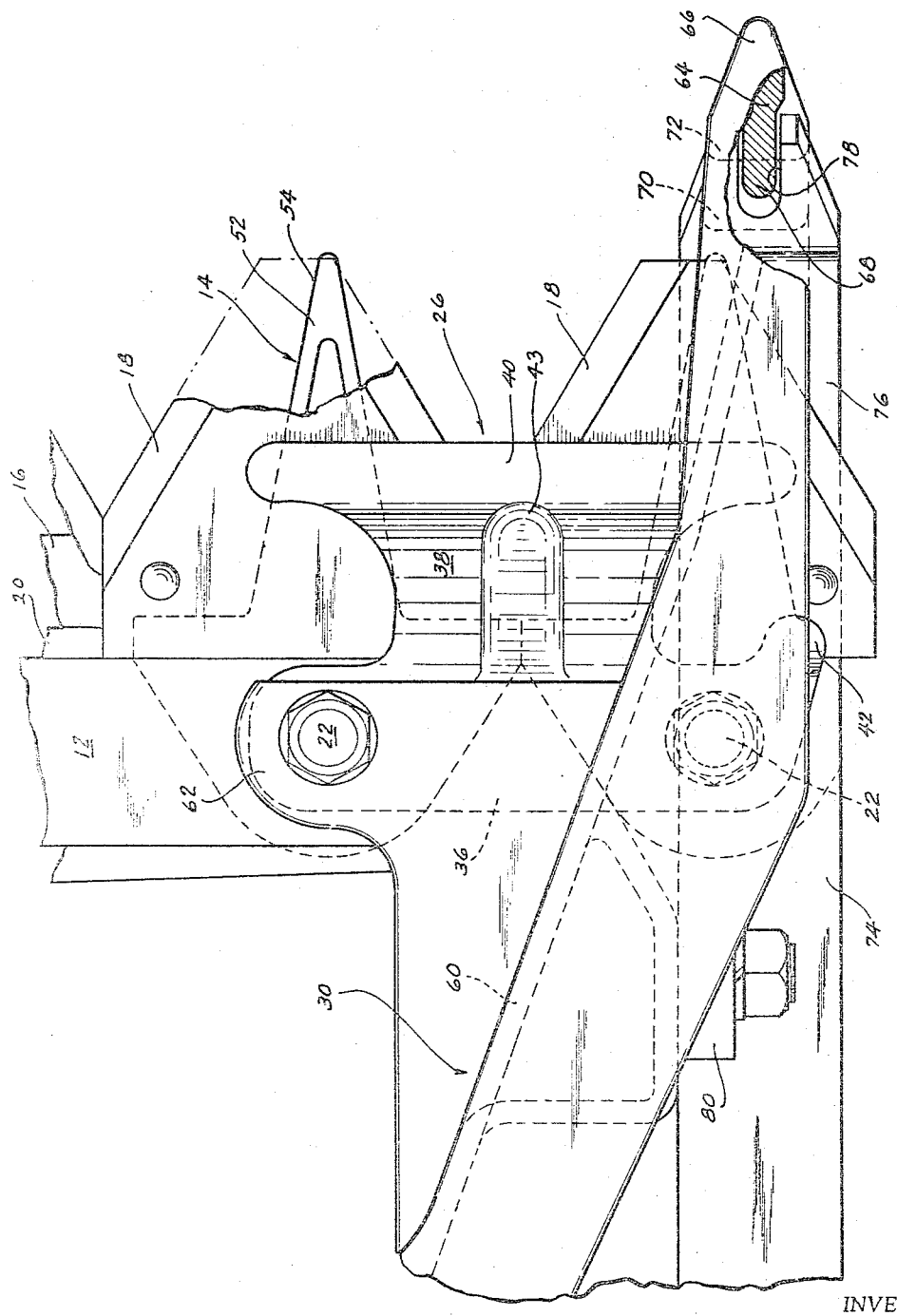

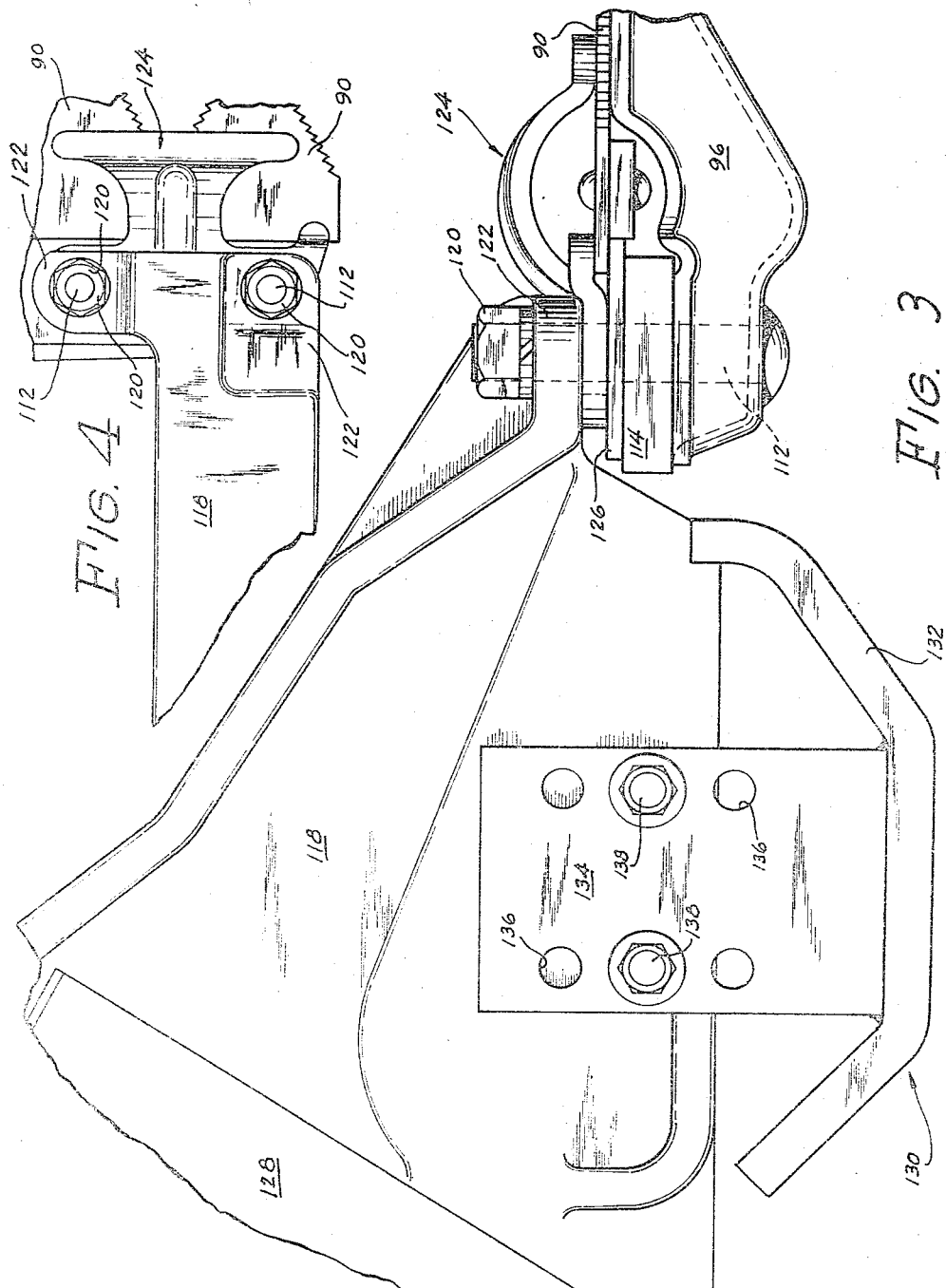

United States Patent Office 3,309,853
Patented Mar. 21, 1967

3,309,853
AGRICULTURAL IMPLEMENT
Laurel R. Yeske, 3607 Pheasant Run,
Rockford, Ill. 61103
Original application Apr. 19, 1962, Ser. No. 188,750.
Divided and this application July 9, 1965, Ser. No. 484,496
6 Claims. (Cl. 56—314)

This application is a division of the application of Laurel R. Yeske, Ser. No. 188,750, now abandoned, filed Apr. 19, 1962, and the present invention relates to agricultural implements, and specifically to cutting mechanism, and an object thereof is to generally improve the construction and operation of devices of this class.

In the harvesting of grain, grass and similar crops, it is customary to use a cutting mechanism of the type including a rugged bar which is advanced into the crop in a direction transverse to its length and which has on its forward edge, a series of projecting fingers or guards which act somewhat as the teeth of a comb and also as components of a series of shear mechanisms. A sickle bar extends along the guard bar and is rapidly reciprocated. The sickle bar has a series of blades commonly known as sickle sections which register with the guard fingers and slide thereon, each guard finger and its associated sickle section acting as a complete shearing device, and the substantial number of these shearing devices on the front of the guard bar resulting in the complete shearing of a swath of crop material as wide as the length of the cutter bar. Commonly, the guard fingers extend forwardly beyond the ends of the sickle sections and have lips which extend rearwardly over the sickle sections to assist in holding the crop in an upright position, at the instant it is cut.

This type of cutter bar has been generally satisfactory and widely used, but it has not been free from difficulty, particularly under adverse conditions, such as when endeavoring to work in down or tangled crops. Under these conditions, it is necessary to run the cutter bar close to the ground to be sure to get as much as possible of the crop, and in doing so, there is danger of hitting stones and the like, and furthermore, the crop itself in its tangled state offers serious resistance to penetration by the fingers. The bar ordinarily has an outer shoe or runner arrangement and which in itself offers a considerable degree of resistance to penetration in crops of this character. For these and other reasons, conventional cutter bars do not always work well under adverse conditions.

Accordingly, a further object of the invention is to provide a cutting mechanism which will continue to operate under conditions which would impair or prevent the operation of heretofore known mechanisms.

Further objects are to provide a cutter bar mechanism which will penetrate a tangled crop in a superior manner; which will be virtually free from clogging by dirt; which will resist damage from obstructions in a superior manner; which is relatively simple and easy to fabricate; which is lighter than known cutter bars of comparable strength; which has an outer shoe which will deal with a tangled crop in a superior manner; and which will cut in a dependable manner, a crop consisting of relatively dry slippery stems.

Further objects and advantages will become apparent from the following specification and accompanying drawings, in which, FIGURE 1 is a right end elevation of a cutter bar embodying the invention showing a form of outer shoe, with parts broken away and parts shown in section;

FIG. 2 is a plan view of the same with parts broken away and parts shown in section;

FIG. 3 is a right end view of a cutter bar with parts broken away showing a modified type of outer shoe, sickle section, and guard finger; and FIG. 4 is a reduced fragmentary plan view of a portion of the structure shown in FIG. 3.

Figure 1:
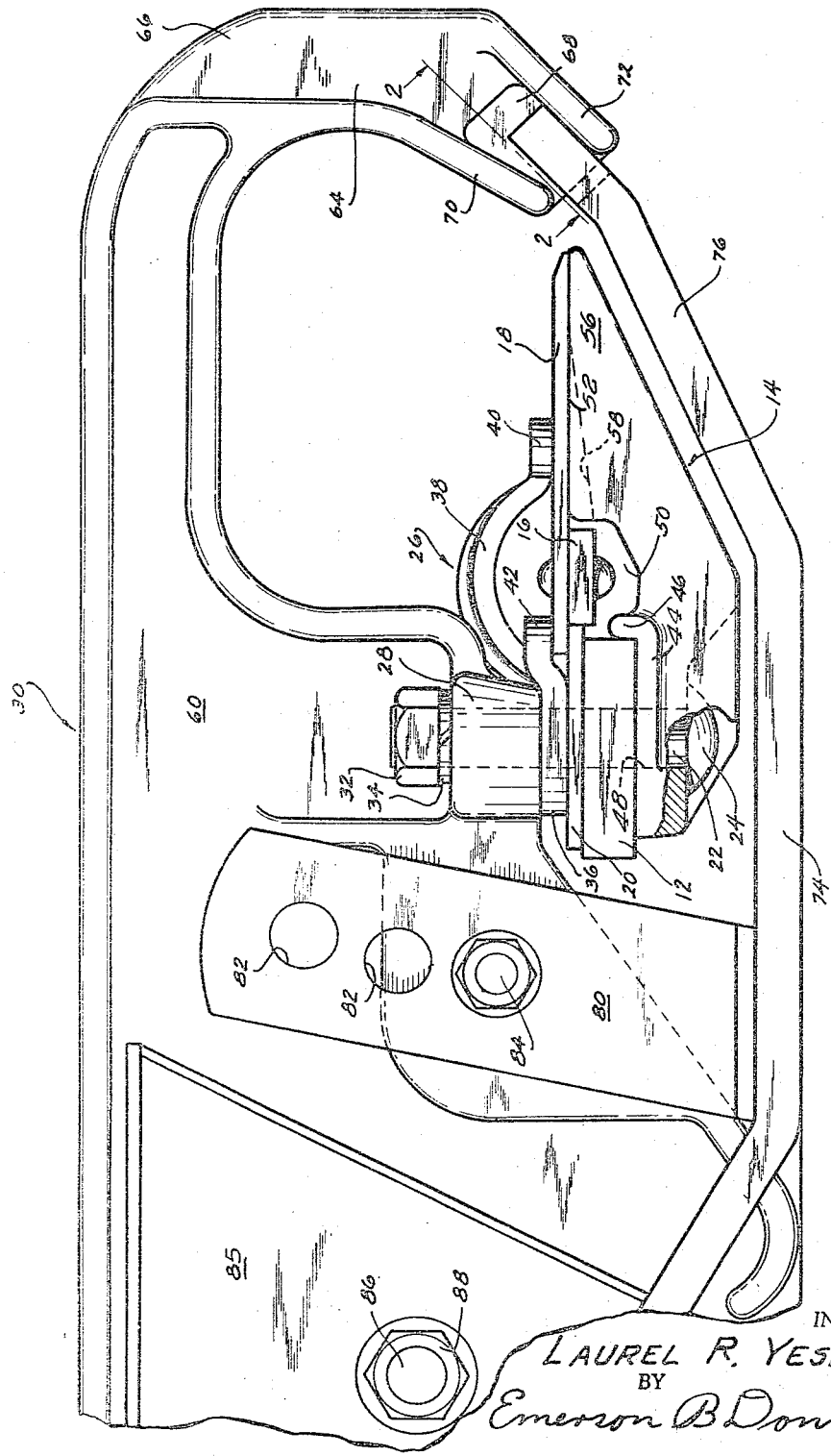

Similar reference characters have been applied to the same parts throughout the following specification and the drawings, which are to be taken as illustrative, it being understood that the invention is not to be considered as limited by the drawings or in any manner except as defined in the claims.

As seen in FIGS. 1 and 2, the cutter bar comprises a main member or guard bar 12 to which is attached a guard finger generally designated as 14, it being understood that a substantial number of guard fingers are spaced along the length of guard bar 12. A sickle bar 16 carrying a series of blades or sickle sections 18—18 is disposed forwardly on guard bar 12 and is rapidly reciprocated by mechanism not necessary to show, as it forms no part of the present invention.

As will be apparent, and as is well known, the cutting edges of sections 18 will therefore cooperate with guard fingers 14 to shear crop material presented therebetween by the movement of the cutter bar to the right as seen in FIGS. 1 and 2. The reaction of the cutting force tends to force sickle bar 16 backwardly or to the left in FIGS. 1 and 2, and it bears against the edge of a wear strip 20, the back of sickle sections 18, in the present instance resting on wear strip 20 so that the sickle as a whole is supported and guided for reciprocation. Guard fingers 14 are held in place, in the present instance beneath guard bar 12, by bolts 22, each bolt having a head 24, and passing upwardly through guard bar 12 and wear plate 20. Above wear plate 20, a hold-down clip, generally designated as 26, has a portion through which bolt 22 passes, the bolt continuing through a boss 28 forming a part of an outer shoe, generally designated as 30. Bolt 22 has a nut 32 which bears downwardly against boss 28, a washer 34 being interposed if desired.

Hold-down clip 26 includes a flange portion 36 and a forwardly extending arched portion 38. The latter extends upwardly, forwardly, and then downwardly over sickle sections 18 and has a portion 40 pressing lightly downward, or approaching with minimum running clearance, the upper surfaces of sickle 18, approximately midway between the front and rear extremities thereof. Flange portion 36 is engaged by two of the above-mentioned bolts 22 so that clip 26 is rigidly held in place, flange 36 also having a forwardly extending and upwardly offset finger 42 engaging with running clearance the rear edge of the adjacent sickle section 18. In this manner, the sicyle sections are held down on guard fingers 14 so as not to be readily dislodged by tangled crop material, dirt, obstructions, or otherwise. Clip 26 preferably has a rib 43 formed on arched portion 38 for stiffening the latter.

Guard finger 14 comprises a flange portion 44 having a transverse upwardly directed lip 46 engaged with the forward edge of guard bar 12, bolt 22 extending through an opening 48. Flange 44 is extended laterally of finger 14 to the greatest possible extent, so that finger 14, so engaged with guard bar 12 is extremely rugged and firmly and rigidly attached to the guard bar against displacement by normal working loads or by accidental encounters with obstructions.

Forwardly of lip 46, guard finger 14 has a throat portion 50, and forwardly of throat 50, has a raised portion presenting a smooth shearing portion 52. Surface 52 is preferably machined to form a smooth bearing or shearing surface with sickle sections 18 and to form a sharp edge 54 with the upwardly directed side walls 56 of the guard finger.

Surface 52 provides a recess or cavity 58 extending backwardly from a point spaced from the forward tip of guard finger 14 and opening into throat 50. This provides a path for dirt or crop material which may tend to find its way between sickle sections 18 and surface 52. Such material may promptly escape into recess 58 and work its way back to throat 50 where it will be discharged so as not to clog the cutter bar.

A further advantage arises from the provision of recess 58 in that surface 52 is thereby substantially limited to form what might be termed a peripheral cutting surface. The parts are orinarily hardened but even so, in view of the abrasive nature of the dust and the like which is present at all times, there is appreciable wear which takes place continuously. This tends to round the cutting edges, especially the edges 54 of the guard fingers. However, in view of the limited area of the surface 52 by reason of the presence of cavity 58, the wearing away of surface 52 is sufficiently rapid so that the edge 54 does not have an opportunity to become too dull for efficient operation. The apparatus therefore is, to a large extent, self-sharpening, and remains in working condition for long periods without attention.

It is to be noted that the sickle sections slide directly on the material of the guard finger, there being no ledger plate interposed. Such a guard finger is very simple and inexpensive to produce, it being necessary merely to form the finger, harden it, and then grind or otherwise machine the surface 52, the resulting guard being so inexpensive that it is entirely practical to operate it until the end of its useful life, and then discard and replace it. In view of the self-sharpening property, the useful life of the guard without replacing will be so long that the overall cost will be less than the usual procedure of removing and replacing ledger plates, or sharpening and replacing ledger plates.

In view of the fact that there is nothing forwardly of the tips of guard fingers 14, there is nothing which has to penetrate a tangled crop before the active cutting blades or sickle sections can make contact with it. As a result, the cutter bar will travel through virtually any type of lodged crop material without difficulty; it being even possible to cut through a bale of hay with the device.

Referring again to FIGS. 1 and 2, shoe 30 comprises an arch member 60 supported on the outer end of guard bar 12 and fixed thereto by above-mentioned boss 28, two of bolts 22, which secure the outermost two guard fingers 14 and a boss 62, the arch member extending generally upwardly from boss 28, then forwardly with generous clearance, over the outermost guard 14 and downwardly a little in front thereof. Arch 60 has a forward portion 64 which has a rounded front margin 66 and a relatively thin web portion 68 having upper and lower flanges 70 and 72. A slipper including a foot or runner portion 74 extends generally in the direction of travel and has an upwardly inclined forward portion 76 having a notch 78 engaging with portion 68 between flanges 70 and 72. The parts are formed with generous clearances so that slipper 74 is in effect loosely pivoted to forward portion 64 of arch 60. A foot portion 80 of slipper 74 extends upwardly alongside of arch member 60 and has a series of holes 82—82 one of which is engaged with a bolt 84 engaged in a portion of arch member 60 rearwardly of boss 28. Slipper 74 is thereby maintained in position against displacement from web 68. Holes 82 are preferably located approximately on the circumference of a circle having the pivotal point of portion 76 about web 68 as a center. Therefore, slipper 74 may be located with bolt 84 in any one of holes 82 so that slipper 74 may be positioned a selected distance below guard finger 14. In this manner, the height of the cutter bar above the ground is determined at the outer end. Arch member 60 extends backwardly and somewhat away from the observer in FIG. 1, and carries the usual grass board 85 secured in place by a bolt 86 having a nut 88.

FIGS. 3 and 4 show a sickle section 90, a guard finger 96, and a modified type of outer shoe consisting of a body portion 118 fastened to two bolts 112 in a manner essentially similar to that of shoe 30, and having nuts 120 clamping bosses 122 to hold-down clips 124, a wear plate 126 and guard bar 114. Body portion 118 extends backwardly and away from the observer in FIG. 3 and carries at its rearward extremity, the usual grass board 128. In this embodiment there is no part of the shoe forward of the guard finger 96, so that the forwardmost part of the entire cutter bar is the guard finger with the reciprocating sickle substantially flush with the tip thereof, and therefore nothing to offer resistance to the entrance of the cutter bar into a tangled crop.

It will be observed that the outer shoe does not incorporate a guard finger, but in the case of the FIG. 1 embodiment, partially encloses one of the regular guard fingers 14, modified by trimming away the outermost edge of flange 44, as indicated in FIG. 2. In the case of the FIG. 3 embodiment, the outermost guard finger 96 is not enclosed within the shoe, but is in alignment with and forwardly of the shoe 118.

A slipper generally designated as 130 has an upwardly inclined front portion 132 which preferably terminates somewhat to the rear of guard bar 114. Slipper 130 has a foot portion 134 provided with a plurality of bolt holes 136—136 in which are engaged bolts 138—138. Bolts 138 maintain slipper 130 in predetermined relation to body portion 118, and the height of the cutter bar above the ground may be controlled by securing foot piece 134 with bolts 138 in different holes 136. Different sized foot pieces are contemplated as within the scope of the incention.

The operation of the invention is thought to be clear from the foregoing description of the construction, it being apparent that the reciprocating sickle guards are substantially directly presented to the crop, so that no amount of tangling or matting of the crop material will have any serious deterrent effect on the action of the cutter bar. Furthermore, the lack of the usual lips above the cutting surfaces of the guard fingers makes it unlikely that stones, sticks, etc., will lodge between the guards to jam the sickle. Such objects are usually thrown out of the way without causing any damage.

With the conventional cutter bar construction, it occasionally happens that the sickle is raised out of place temporarily by an obstruction whereupon the sickle sections hit some of the lips, causing serious damage.

In the construction according to the invention, this cannot happen, since the space above the guard fingers is unencumbered, and the sickle may move freely and return to its proper place when the obstruction is passed.

The action of the sickle sections directly on the surfaces of the guard fingers, by reason of the limited peripheral contact resulting from the cavities in the upper or shearing surfaces of the guards, results in a self sharpening effect such that the cutter bar will operate for long periods without sharpening or other attention. When repair is finally necessary, it is simple and inexpensive to merely discard the worn-out guards and replace them with new ones.

It is thus seen that the preferred outer shoe construction includes a slipper which has the advantages of being loosely pivoted at its forward end by reason of the generous clearances with the forward shoe portion, the shoe is embodied around and is entirely independent of the cutter, which makes it possible to assure a true alignment of the cutting parts. The modified outer shoe construction includes a slipper which has no part forward of the guard fingers and serves only as a runner and swathboard supporting member.

The above being a complete description of embodiments of the invention which will accomplish the objects hereinbefore stated, what is claimed as new, and desired to be secured by Letters Patent of the United States is:

1. In an outer shoe for a cutting mechanism of the type including a guard bar, a series of guard fingers fixed thereto, fastening means for fixing said guard fingers to said guard bar and a sickle bar reciprocably guided on said bar and having a series of cutting blades fixed thereto in position to cooperate with the guard fingers, and hold down means for said cutting blades, said outer shoe comprising a member transverse to said guard bar extending upwardly and rearwardly from said guard bar, means on said member engaged with the fastening means of one of said fingers for securing said member on said guard bar and also engaged with said hold down means, a slipper connected to said member and extending generally beneath said member, said slipper being positioned to engage the ground and support said member and said guard bar for travel therealong, and means on said slipper engaged with said member for determining the position of said slipper relative to said member whereby to maintain the cutting mechanism at a predetermined height above the ground, and the last mentioned means having another position in which it causes said slipper to maintain said cutting mechanism at a different height above the ground.

2. In an outer shoe for use with a cutting mechanism of the type including a guard bar, a series of guard fingers fixed thereto, fastening means for fixing said guard fingers to said guard bar and a sickle bar reciprocably guided on said guard bar and having a series of cutting blades fixed thereto in position to cooperate with the guard fingers, and hold down means for said cutting blades, said outer shoe comprising a downwardly open arch member transverse to said guard bar curving upwardly from behind, forwardly over, and downwardly in front of said guard bar, means on said arch member engaged with the fastening means of one of said fingers for securing said arch member on said guard bar and also engaged with said hold down means, a notched slipper member loosely connected to said arch member forwardly of said guard finger, said slipper extending rearwardly generally beneath said guard finger and forming with said arch member an opening through which said sickle bar can reciprocate, said slipper being positioned to engage the ground and support the arch and guard bar for travel therealong, and means on said slipper engaged with said arch member for determining the position of said slipper relative to said arch member whereby to maintain the cutting mechanism at a predetermined height above the ground, and the last mentioned means having another position in which it causes said slipper to maintain said cutting mechanism at a different height above the ground.

3. A cutting mechanism for fibrous crop material comprising the combination of a guard bar, a plurality of forwardly extending guard fingers spaced along said guard bar, fastening means securing said fingers to said guard bar, a reciprocating sickle element including a plurality of sickle sections positioned to cooperate with said guard fingers, hold down means for said sickle sections, an outer shoe including a member transverse to said guard bar extending upwardly and rearwardly from said guard bar, means on said member engaged with the fastening means of one of said fingers for securing said member on said guard bar, a slipper connected to said member and extending generally beneath said member, said slipper being positioned to engage the ground and support said member and said guard bar for travel therealong, and means on said slipper engaged with said member for determining the position of said slipper relative to said member, whereby to maintain the cutting mechanism at a predetermined height above the ground.

4. An outer shoe for a mower having a guard bar, a plurality of guard fingers fixed thereto and spaced along said guard bar, fastening means securing said fingers to said guard bar, and a reciprocating sickle bar including a plurality of sickle sections positioned to cooperate with said guard fingers, said outer shoe including a member transverse to said guard bar extending upwardly and rearwardly from said guard bar, means on said member engaged with the fastening means of at least one of said fingers for securing said member on said guard bar, a slipper connected to said member and extending generally rearwardly of said guard bar, said slipper being positioned to engage the ground and support said member and said guard bar, and means on said slipper engaged with said member for determining the position of said slipper relative to said member to maintain the guard bar at a predetermined height above the ground.

5. An outer shoe for a mower having a guard bar, a plurality of guard fingers fixed thereto and spaced along said guard bar, fastening means securing said fingers to said guard bar, a reciprocating sickle bar including a plurality of sickle sections positioned to cooperate with said guard fingers, and hold down means for said sickle sections, said outer shoe including a member transverse to said guard bar extending upwardly and rearwardly from said guard bar, means on said member engaged with the fastening means of at least one of said fingers for securing said member on said guard bar and positioned to engage with said hold down means, a slipper connected to said member and extending generally rearwardly of said guard bar, said slipper being positioned to engage the ground and support said member and said guard bar, and means on said slipper engaged with said member for determining the position of said slipper relative to said member to maintain the guard bar at a predetermined height above the ground.

6. An outer shoe for a mower having a guard bar, a plurality of guard fingers fixed thereto and spaced along said guard bar, fastening means securing said fingers to said guard bar, and a reciprocating sickle element including a plurality of sickle sections positioned to cooperate with said guard fingers, said outer shoe including a member transverse to said guard bar extending upwardly and rearwardly from said guard bar, means on said member engaging with the fastening means of two of said fingers for securing said member on said guard bar, a slipper connected to said member and extending generally rearward of said member, said slipper being positioned to engage the ground and support said member and said guard bar, and means disposed fore-and-aft on said slipper and engaged with said member for maintaining said slipper in a predetermined position and for maintaining the guard bar at a predetermined height above the ground.

References Cited by the Examiner

UNITED STATES PATENTS

| | | | |
|---|---|---|---|
| 152,211 | 6/1874 | Browning et al. | 56—298 |
| 774,219 | 11/1904 | Whittinghill | 56—320 |
| 1,358,401 | 11/1920 | Synck et al. | 56—276 |
| 1,755,506 | 4/1930 | Jackson | 56—314 |
| 2,700,267 | 1/1955 | McElrath | 56—307 |
| 3,058,228 | 10/1962 | Karg | 56—305 |

ABRAHAM G. STONE, *Primary Examiner.*

RUSSELL R. KINSEY, *Examiner.*